(12) United States Patent
Harlow et al.

(10) Patent No.: US 12,239,103 B2
(45) Date of Patent: Mar. 4, 2025

(54) PET TOY

(71) Applicant: KABOOM WORLDWIDE, LLC, Fort Lauderdale, FL (US)

(72) Inventors: Kristen Harlow, Fort Lauderdale, FL (US); Katherine Dover Koenig, Fort Lauderdale, FL (US)

(73) Assignee: KABOOM WORLDWIDE, LLC, Fort Lauderdale, FL (US)

( * ) Notice: Subject to any disclaimer, the term of this patent is extended or adjusted under 35 U.S.C. 154(b) by 181 days.

(21) Appl. No.: 17/322,389

(22) Filed: May 17, 2021

(65) Prior Publication Data

US 2021/0352874 A1 Nov. 18, 2021

Related U.S. Application Data

(60) Provisional application No. 63/026,066, filed on May 17, 2020.

(51) Int. Cl.
*A01K 15/02* (2006.01)
*A63H 37/00* (2006.01)

(52) U.S. Cl.
CPC ............ *A01K 15/025* (2013.01); *A63H 37/00* (2013.01)

(58) Field of Classification Search
CPC .... A01K 15/025; A01K 15/026; A01K 15/02; A63H 37/00; A63H 2027/1091; A63H 33/00; B65D 88/1668; B65D 31/00; B65D 33/1675; B65D 2519/00089; B65D 25/087; B65D 2577/2041

USPC ................ 119/708, 702, 707, 709; D30/160; 383/67, 906, 42

See application file for complete search history.

(56) References Cited

U.S. PATENT DOCUMENTS

| | | | |
|---|---|---|---|
| 3,702,675 A | 11/1972 | Bajo | |
| 3,820,200 A * | 6/1974 | Myers | B65D 33/1625 24/30.5 S |
| 4,015,364 A | 4/1977 | Oquita | |
| 4,167,078 A | 9/1979 | Oquita | |
| 4,253,266 A * | 3/1981 | Bajo | A63H 37/00 446/69 |
| 4,787,872 A | 11/1988 | Bajo | |
| 5,109,576 A * | 5/1992 | Teekell | B65D 33/1675 24/30.5 R |
| 5,263,889 A | 11/1993 | Ledonne | |
| 5,562,518 A | 10/1996 | Estrada | |
| 5,824,378 A | 10/1998 | Armendariz et al. | |
| 6,171,166 B1 | 1/2001 | Oquita | |
| 6,325,022 B1 * | 12/2001 | LaFeber, III | A01K 29/00 119/708 |
| 6,354,904 B1 * | 3/2002 | Grey | A63H 37/00 446/5 |
| 6,648,713 B1 | 11/2003 | Oquita | |

(Continued)

*Primary Examiner* — Jeffrey R Larsen
(74) *Attorney, Agent, or Firm* — Koenig IP Works, PLLC

(57) ABSTRACT

A device for containment and release of items therein, such as a device configured for engagement with one or more pets, such as dogs. The disclosure also relates to methods of using the device to release items for the entertainment and engagement of pet(s). In one embodiment, a device for containing and releasing items therein comprises: a body defining an inner chamber and at least one closable opening; and a pull element attached to the body, the pull element being configured to open the opening of the body when a pull force is exerted on the pull element.

10 Claims, 12 Drawing Sheets

(56) References Cited

U.S. PATENT DOCUMENTS

| | | | |
|---|---|---|---|
| 10,449,467 B1 | 10/2019 | Vaca | |
| 10,888,798 B1* | 1/2021 | Vaca | A63H 33/00 |
| 2003/0104757 A1* | 6/2003 | Rasmussen | A63H 37/00 |
| | | | 446/397 |
| 2005/0197036 A1 | 9/2005 | Won et al. | |
| 2006/0234595 A1* | 10/2006 | Bell | A63H 37/00 |
| | | | 446/5 |
| 2007/0234969 A1* | 10/2007 | Lynch | A01K 15/02 |
| | | | 119/707 |
| 2009/0000565 A1* | 1/2009 | Bryce | A01K 15/025 |
| | | | 119/707 |
| 2017/0225092 A1* | 8/2017 | Ferrer-Walsh | A63H 37/00 |
| 2019/0069517 A1* | 3/2019 | Glenn | A01K 15/025 |
| 2019/0329146 A1 | 10/2019 | Menow | |
| 2020/0206650 A1* | 7/2020 | Pérez Schmidt | A63H 37/00 |

* cited by examiner

PET TOY

CROSS-REFERENCE TO RELATED APPLICATIONS

This application is related to and claims the benefit of U.S. Provisional Patent Application Ser. No. 63/026,066, filed May 17, 2021, entitled PIÑATA DEVICE, the entirety of which is incorporated herein by reference.

GOVERNMENT RIGHTS STATEMENT

N/A.

FIELD

This disclosure relates to a device for containment and release of items therein, such as a piñata configured for engagement with one or more pets (for example, dog(s)). The disclosure also relates to methods of using the device to release items for the entertainment and engagement of pet(s).

BACKGROUND

Traditionally, piñatas are destructible containers filled with toys, candy, or other items. When the body of the piñata is broken, such by force with a stick or bat by a blindfolded player, the items spill from the body and fall to the ground. Piñatas have been used for centuries in religious ceremonies, and more recently as a party game to delight and entertain children and adults alike. However, the practice of using blows to break the body can be dangerous, especially when made by blindfolded children.

To overcome this inherent hazard, different versions of piñatas and gameplay have been devised, such as the use of pull cords to break the body or including a fragile floor that breaks by movement of the items inside the piñata, instead of requiring the use of force. However, these systems involve complicated and delicate release mechanisms that realistically do not allow for use of, or prolonged use of, the piñata by a pet, such as a dog. For example, there is nothing about the pull strings that are attractive enough to a dog that would entice the dog to engage with the strings to break the body and release the items therein.

Another problem with traditional piñatas is that they can only be used once, as the body is destroyed to release the items therein. Various versions of the piñata have been developed to allow for the re-use of the body; however, none of these are sturdy enough to withstand a pull force on a string and/or other part by a dog for an extended period of time. Put another way, none of these can be used to allow the dog to play or engage with the piñata for a period of time without breaking immediately.

SUMMARY

Some embodiments advantageously provide a device for containing and releasing items therein, such as a device usable as a dog toy and configured for engagement with one or more pets (such as dogs). In one embodiment, a device for containing and releasing items therein comprises: a body defining an inner chamber and at least one closable opening; and a pull element attached to the body, the pull element being configured to open the closable opening of the body when the closable opening is in a closed configuration and a pull force is exerted on the pull element.

In one embodiment, the device further comprises a pull element cord having a first end and a second end opposite the first end, the first end of the pull element cord being attached to the body and the second end of the pull element cord being attached to the pull element.

In one aspect of the embodiment, the body includes at least one closure element proximate the closable opening. In one aspect of the embodiment, the at least one closure element is at least one of a hook-and-loop fastener, a magnet, a snap, and a clamp.

In one aspect of the embodiment, the body includes a sealing element proximate the closable opening, the sealing element being flap, each of the flap and the body including at least one fastening element, the at least one fastening element of the flap being configured to releasably engage the at least one fastening element of the body, the first end of the pull element cord being attached to the flap.

In one aspect of the embodiment, the device further comprises: a closure element configured to be removably attached to the body to close the closable opening; and a pull element cord having a first end and a second end opposite the first end, the first end of the pull element cord being attached to the closure element and the second end of the pull element cord being attached to the pull element. In one aspect of the embodiment, the body is composed of a paper-based material.

In one aspect of the embodiment, the device further comprises at least one suspension cord attached to the body. In one aspect of the embodiment, the at least one suspension cord includes a first end and a second end opposite the first end, the first end of the pull element cord being attached to the body at a first location and the second end of the at least one suspension cord being attached to the body at a second location that is different than the first location. In one aspect of the embodiment, the second location is opposite the first location.

In one aspect of the embodiment, the closable opening is configured to be opened without damaging the body.

In one embodiment, device for containing and releasing items therein comprises: a body defining a first body portion and a second body portion that is removably couplable to the first body portion; a graspable element attached to the first body portion; and a pull element attached to the second body portion, the graspable element and/or the pull element being configured to separate the first body portion and the second body portion when a pull force is exerted on the graspable element and/or the pull element.

In one aspect of the embodiment, each of the first body portion and the second body portion includes at least one sealing element, the at least one sealing element of the first body portion being configured to be aligned with the at least one sealing element of the second body portion to close the body.

In one embodiment, a device for containing and releasing toy items therein comprises: a sealed body defining an inner chamber; one or more toy items within the inner chamber of the sealed body; and a pull element attached to the body, the body being configured to break open when a pull force is exerted on the pull element.

In one aspect of the embodiment, the device further comprises: a pull element cord having a first end and a second end opposite the first end, the first end of the pull element cord being attached to the body at a first location and the second end of the pull element cord being attached to the pull element; and a suspension cord having a first end and a second end opposite the first end, the first end of the suspension cord being attached to a handle and the second end of the suspension cord being attached to the body at a second location.

In one aspect of the embodiment, the first location is opposite the second location.

In one aspect of the embodiment, the body is composed of a paper-based material.

In one aspect of the embodiment, the body includes at least one area of weakness.

In one embodiment, a method of releasing a toy item from an inner chamber of a body comprises: supporting the body by a first cord attached to a first end of the body, the toy item being within the inner chamber of the body; suspending a pull element from a second cord attached to a second end of the body; and engaging a pet with the pull element such that the pet exerts a pull force on the pull element, the pull force exerted on the pull element causing the body to open to release the toy item from the inner chamber.

In one aspect of the embodiment, wherein the body is composed of paper, the pull force exerted on the pull element causing the body to tear open without the second cord being detached from the body.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
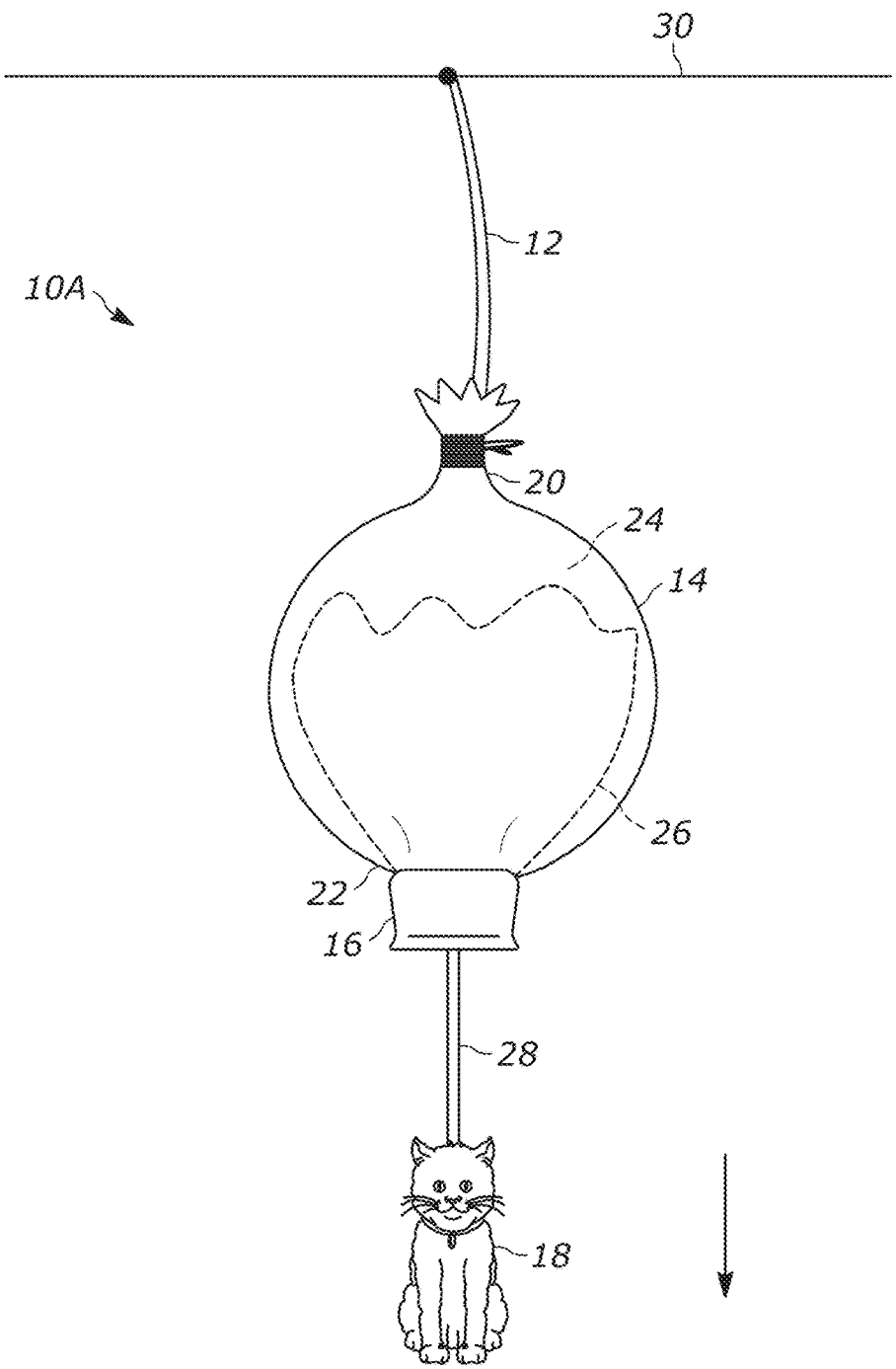
FIG. 1 shows a first exemplary embodiment of a device configured for engagement with a pet, in accordance with the present disclosure, the piñata being in a sealed configuration.

Before describing exemplary embodiments in detail, it is noted that the embodiments reside primarily in combinations of apparatus components and steps related to a piñata configured for engagement with a pet, such as a dog. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Disclosed herein are various embodiments and features of a device for containment and release of items therein, such as a piñata or other breakable or openable item configured for engagement with one or more pets (for example, dog(s)). The device includes at least one pull element for the dog to bite and use to exert a pull force against the body of the device and/or a closure element attached to the body. The body of the device is configured to break apart or otherwise open to release items (for example, prizes such as toys and/or treats) when the pull force is exerted through the pull element. The pull element is configured to be attractive to the dog and to allow to dog to securely engage with the pull element. For example, the pull element may include a squeaky toy attached to the body or to the closure element by a rope or cord. In some embodiments, the device is configured to be suspended from a support, such as a tree branch, beam, ceiling hook, or other structure or item above the ground such that the dog exerts a downward or at least substantially downward (vertical) pull force on the body. In some embodiments, the device is configured to be held by the user or secured to a support, such as a wall hook, tree trunk, pole, or other structure or item at a point above the ground such that the dog exerts a sideways or at least substantially sideways (horizontal) pull force on the body. In some embodiments, the device includes a single body portion with at least one closable opening that is sealable or closable by a closure element that is removably attached or attachable to the body in such a way as to allow the dog to open the body by uncoupling the closure element from the body with a moderate amount of pull force. In some embodiments, the device includes at least two body portions that are removably attached or attachable to each other in such a way as to allow the dog to break open the body by uncoupling the body portions from each other with a moderate amount of pull force. In some embodiments, the device is configured to rip, tear, or break open when the dog exerts a moderate amount of pull force on the pull element.

As used herein, the term "moderate" refers to a pull force that a dog can make during normal play without exerting an abnormal or high amount of effort. Further, the devices disclosed herein may be configured to remain closed until a moderate amount of pull force is exerted by a particular size of dog. For example, stronger and/or more sealing elements (e.g., larger areas of hook-and-look fastener, more clips, more magnets, or the like) may be used if the device is to be used for large dogs of 75 lbs. or more. Conversely, weaker and/or fewer sealing elements may be used if the device is to be used for toy-sized dogs of 12 lbs. or less. Put another way, the device may be adapted to provide an enjoyable and satisfying tug play depending on the size and strength of the dog(s) that will be engaging with the device. However, although it is contemplated that the device may be adjusted to suit any breed and/or size of dog, it will be understood that the device may be manufactured and sold with only a single sealing element configuration without consideration of breed and/or dog size. Additionally, the attachment point(s) between the pull element cord(s) and the second end of the body are stronger than the sealing means, to ensure that the pull force exerted on the pull element(s) will open the body before the pull element cord(s) are detached from the body.

Figure 2:
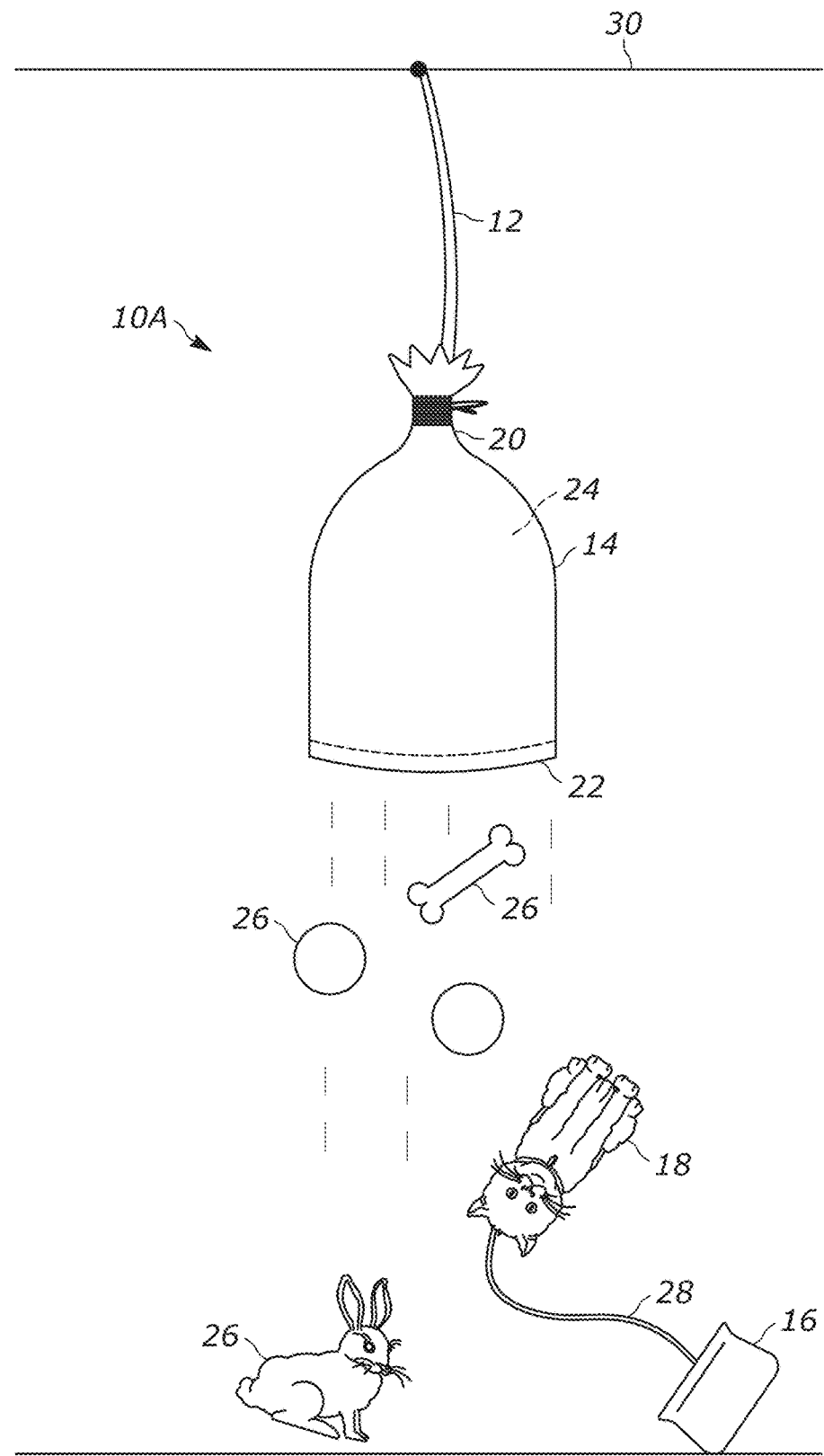
FIG. 2 shows the first exemplary embodiment of a device of FIG. 1, in accordance with the present disclosure, the device being in a prize release configuration.

Referring now to the figures in which like reference designators are used for like elements, a first exemplary embodiment of a device 10A is shown in FIGS. 1 and 2. The device 10A generally includes a suspension cord 12, a body 14, a closure element 16, and a pull element 18. In one embodiment, the body 14 is a bag or sack with a first end 20 and a second end 22 opposite the first end 20. In one embodiment, both the first end 20 and the second end 22 of the body 14 are sealable. In one embodiment, the first end 20 is sealable by a drawstring and the second end 22 is sealable by the closure element 16. However, it will be understood that other closure means for the first end 20 may be used, such as hook-and-loop fastener, snaps, clamps, magnets, or the like, instead of or in addition to a drawstring. Alternatively, in some embodiments, the first 20 end may be left open when the device 10A is in use. Regardless of the configuration of the first end 20, the body 14 is securely attached to the suspension cord 12 at the first end 20 so the body 14 does not separate from the suspension cord 12 when the device 10A is in use. In some embodiments, the closure element 16 at the second end 22 of the body 14 is a clip or clamp that is quickly and easily attachable to the body 14 to seal the opening of the second end 22 of the body. However, it will be understood that other closure elements and/or means for sealing the opening. For example, in some embodiments, the opening of the second end 22 may include hook-and-look fastener, snaps, clamps, magnets, a drawstring, or the like. Regardless of the configuration of the closure element 16 and/or the second end 22 of the body 14, the closure element 16 is released (and the second end 22 of the body 14 opened) when the dog exerts a moderate pull force on the pull element, discussed in greater detail below. It is noted that although the device is discussed herein with reference to engagement by a dog, it is contemplated that children, adults, or animals other than a dog may engage with the device by exerting a pull force on the pull element to release the items within the body.

Continuing to refer to FIGS. 1 and 2, the suspension cord 12 is attached to the first end 20 of the body 14, such as to a portion of the first end 20 of the body 14. In one embodiment, the suspension cord 12 is a rope or cord composed of woven or braded strings, threads, or lines, but in other embodiments the suspension cord is a flexible material such as nylon webbing strap, rubber cord, cable, or the like, or a rigid or semi-rigid material such as a metal or wooden rod, or combinations thereof. In some embodiments, the suspension cord 12 is sewn or permanently adhered directly to the first end 20 of the body 14, or is integrally formed with the body 14. In other embodiments, the suspension cord 12 is tied or otherwise secured around the first end 20 of the body 14 to cinch and seal the first end 20 and to suspend the body 14 when the device 10A is in use.

Continuing to refer to FIGS. 1 and 2, the body 14 defines an inner chamber 24 and is sized to contain a number of items 26 therein. The body 14 may have any suitable size, which may depend on the size of the items 26 with which the device 10A will be used, the size of the dog, or other considerations. In some embodiments, the body 14 is composed of a strong flexible material. For example, a woven fabric, such as canvas composed of cotton, jute, hemp, denim, silk, nylon, burlap, or other suitable material, a laminate material, such as a polyethylene tarp, or a nonwoven material, such as plastic, neoprene, paper, or combinations thereof. It is also contemplated that the body 14 may be composed of a rigid or semi-rigid material, such as plastic, wood, bamboo, thick paper-based material, or the like. The body 14 (and all components of the device 10A) is composed of a material that is non-toxic to humans and animals, including dogs. The body 14 optionally may be dyed, printed with advertisings, logos, the pet's name, or use instructions, or otherwise decorated.

Continuing to refer to FIGS. 1 and 2, the pull element 18 is attached to the second end 22 of the body 14. In one embodiment, the pull element 18 is attached to a pull element cord 28, which is attached to the closure element 16. In other embodiments, the pull element cord 28 is attached directly to the second end 22 of the body 14. The pull element cord 28 may be a rope or cord, but in other embodiments the pull element cord 28 is a flexible material such as nylon webbing strap, rubber cord, cable, high tenacity polyester, polypropylene, cotton or poly cotton, or nylon, or other material that will allow movement of the pull element 18 relative to the body 14 and will not interfere with the dog's interaction with the pull element 18. In one embodiment, the pull element 18 is an item that is attractive to the dog, such as a squeaky toy, ball, artificial bone, or the like. The pull element cord 28 may be permanently or removably attached to both the pull element 18 and the closure element 16 and/or second end 22 of the body 14, but the attachment point(s) are strong enough to prevent the pull element 18 from being pulled or detached from the pull element cord 28 when the dog exerts a strong force on the pull element 18. Likewise, if the pull element cord 28 is attached directly to the second end 22 of the body 14, the attachment point between the pull element cord 28 and the second end 22 of the body 14 is stronger than the means for sealing the second end 22 of the body 14, to ensure that the pull force exerted on the pull element 18 will open the body 14 before the pull element cord 28 is detached from the body 14. If the pull element cord 28 is attached to a closure element 16, the attachment point between the pull element cord 28 and the closure element 16 is stronger than the attachment between the closure element 16 and the body 14, to ensure that the pull force exerted on the pull element 18 will detach the closure element 16 from the body 14 before the pull element cord 28 is detached from the closure element 16.

Continuing to refer to FIGS. 1 and 2, the device 10A in use is now discussed. With at least one of the first end 20 and the second end 22 open, the user first adds items 26 (prizes) to the inner chamber 24 of the body 14 and then seals the second end 22 of the body 14 (that is, closes the opening using the closure element and/or other closure means), if it was open. Optionally, the user then seals the first end 20 of the body 14. Finally, the user suspends the device 10A from a support 30 with the suspension cord 12. The suspension cord 12 may be tied to the support 30, or may be configured to engage one or more mounting features, such as hooks, loops, secondary suspension cords. However, it will be understood that any means for suspending the device 10A may be used, depending on the size, location, and configuration of the support 30. Once the device 10A is suspended, a dog then engages with (for example, bites) the pull element 18 and pulls it in a direction away from the body 14. This pull force is sufficient to either detach the closure element 16 from the second end 22 of the body 14 or to disengage other closing means to open the second end 22 of the body 14, thereby releasing the items from within the inner chamber 24 (for example, as shown in FIG. 2).

Figure 3:
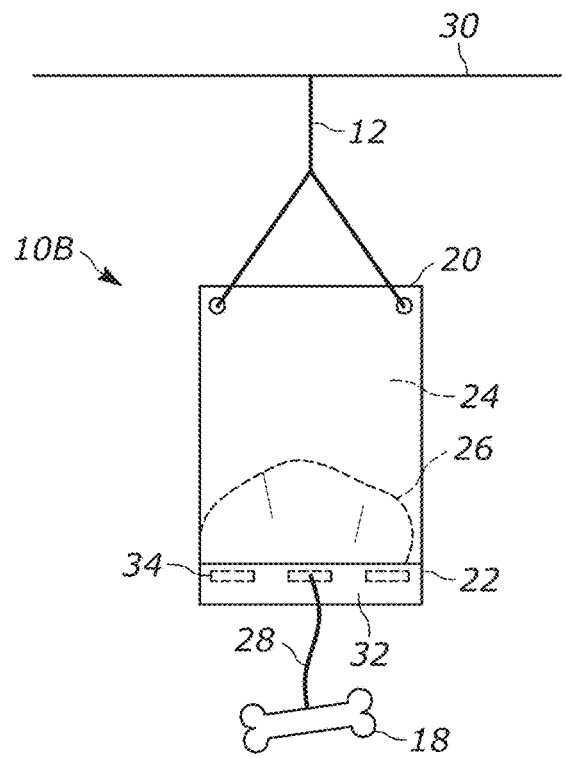
FIG. 3 shows a second exemplary embodiment of a device configured for engagement with a pet, in accordance with the present disclosure.
Figure 4:
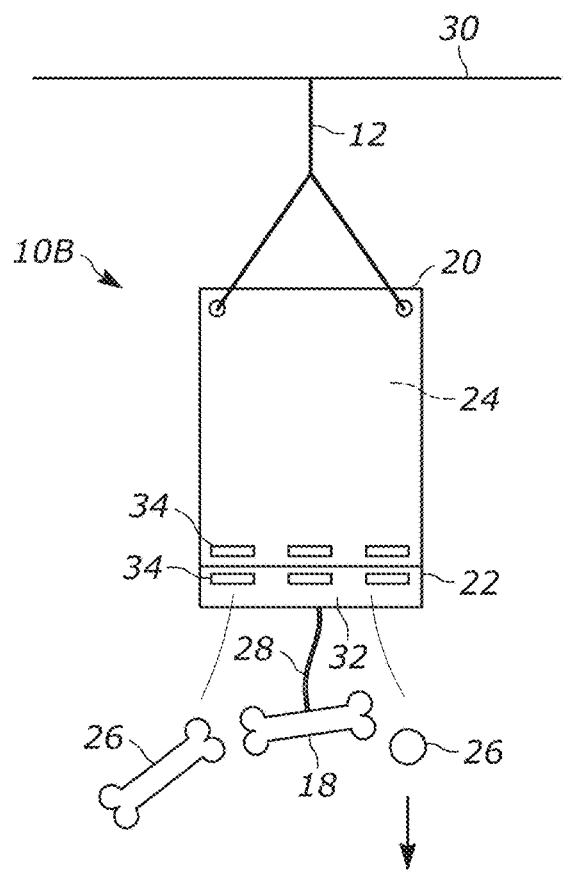
FIG. 4 shows the second exemplary embodiment of a device of FIG. 3, in accordance with the present disclosure, the device being in a prize release configuration.

Referring now to FIGS. 3 and 4, a second exemplary embodiment of a device 10B is shown. The device 10B generally includes a suspension cord 12, a body 14 with a first end 20 and a second end 22 opposite the first end 20, a closure element, and a pull element 18 attached to the second end 22 of the body 14 by a pull element cord 28. The body defines an inner chamber therein 24 that is sized and configured to contain one or more items 26 therein, such as dog toys or treats. Unless otherwise noted, the components of the device 10B of FIGS. 3 and 4 are the same as or substantially similar to those of the device 10A of FIGS. 1 and 2.

Continuing to refer to FIGS. 3 and 4, in some embodiments the first end 20 of the body 14 optionally includes grommets, holes, or other elements for accepting the suspension cord 12 and for coupling the suspension cord 12 to the first end 20 of the body 14. However, it will be understood that other means for coupling the suspension cord 12 to the first end 20 of the body 14 may be used, such as those shown and described in FIGS. 1 and 2. In some embodiments, the first end 20 of the body 14 shown in FIGS. 3 and 4 is closed and does not require additional means or components for sealing. Thus, in the exemplary embodiment shown in FIGS. 3 and 4, only the second end 22 of the body 14 is a sealable open end, and the second end 22 is used to both add items 26 to the inner chamber 24 and to release the items 26 from the inner chamber 24.

Continuing to refer to FIGS. 3 and 4, in some embodiments the second end 22 of the body 14 incudes a closure flap 32 extending from a first side of the body 14. The closure flap 32 and at least a portion of a second side of the body 14 opposite the first side includes at least one closure element in the form of a fastening element 34 such as a hook-and-loop fastener, snaps, clamps, magnets, or the like that is/are embedded within layers of the body 14, affixed or adhered to an outer surface of the body, or otherwise integrated with or coupled to the body. In some embodiments, the fastening element(s) 34 on the closure flap 32 and the fastening element(s) 34 on the body 14 are aligned such that when the closure flap 32 is in the closed position (as shown in FIG. 3), the fastening elements of the closure flap 32 and of the body 14 engage each other to secure the closure flap 32. The type and/or number of the fastening elements 34 may be chosen to suit the size and/or type of dog or other animal that will be using the device 10B. For example, if the device 10B will be used by dogs weighing less than 20 lbs., only one or two pairs of fastening elements 34 may be used, and/or the fastening elements 34 may be a weak-bind type of hook-and-loop fastener (for example, having a 1-lb weight strength), weak magnets, strips or pieces of weak adhesive, or the like. Conversely, if the device 10B will be used by dogs weighing more than 75 lbs., multiple pairs of fastening elements 34 may be used, and/or the fastening elements 34 may be a strong-bind type of hook-and-loop fastener, strong magnets, snaps, or the like.

Continuing to refer to FIGS. 3 and 4, in some embodiments the pull element cord 28 is attached to the closure flap 32 such that when a dog exerts a moderate pull force on the pull element 18, the fastening element(s) 34 on the closure flap 32 disengage with the complementary fastening element(s) 34 on the body 14 to release the items 26 from within the inner chamber 24 (as shown in FIG. 4).

Figure 5:
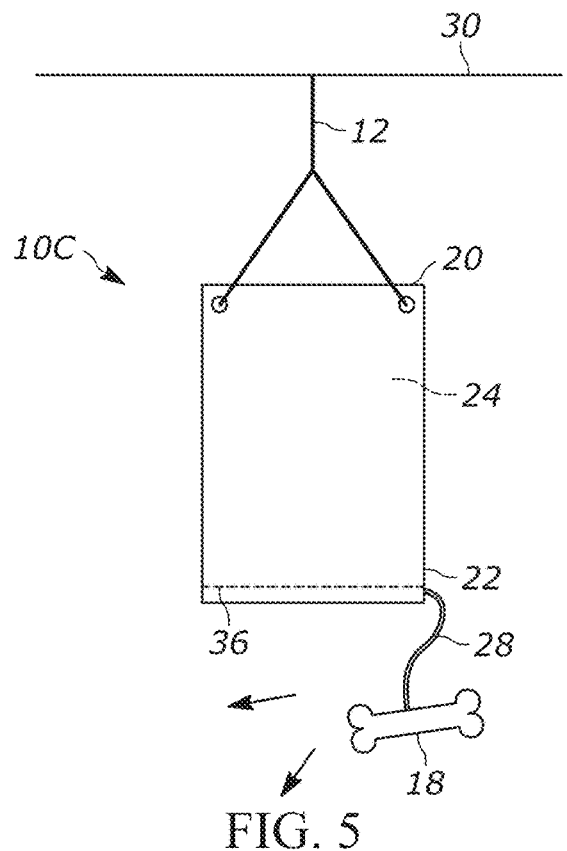
FIG. 5 shows a third exemplary embodiment of a device configured for engagement with a pet, in accordance with the present disclosure.
Figure 6:
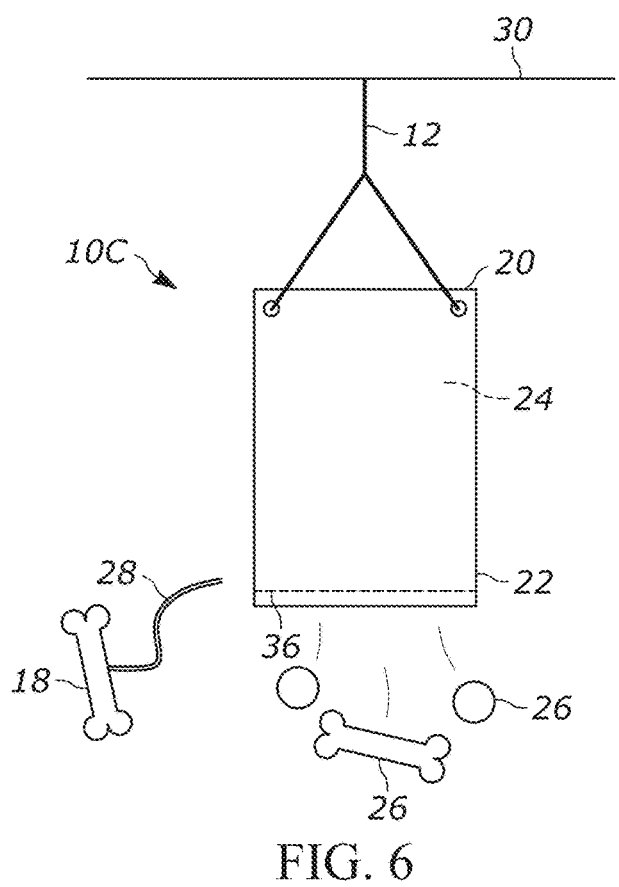
FIG. 6 shows the third exemplary embodiment of a device of FIG. 5, in accordance with the present disclosure, the device being in a prize release configuration.

Referring now to FIGS. 5 and 6, a third exemplary embodiment of a device 10C is shown. The device 10C generally includes a suspension cord 12, a body 14 with a first end 20 and a second end 22 opposite the first end 20, a closure element, and a pull element 18 attached to the second end 22 of the body 14 by a pull element cord 28. The body defines an inner chamber therein 24 that is sized and configured to contain one or more items 26 therein, such as dog toys or treats. Unless otherwise noted, the components of the device 10B of FIGS. 3 and 4 are the same as or substantially similar to those of the devices 10A of FIGS. 1 and 2 and/or 10B of FIGS. 3 and 4.

Continuing to refer to FIGS. 5 and 6, in some embodiments the body 14 is composed of paper, such as Kraft paper, parchment paper, or the like, depending on factors such as the size of the dog(s) using the device, the size and type of items 26 used in the device, the required durability, and other considerations. However, it will be understood that other materials such as burlap, jute, cotton, polyester, polyethylene, and the like are also contemplated. In one embodiment, the closure element is in the form of a chain stitch 36, such as a chain stitch used to seal a feed grain bag, that is easily undone when the pull element cord 28 is pulled by the dog. In one non-limiting example, the chain stitch 36 is made with a cord, string, thread, or other suitable line or cordage, and this same cordage serves as the pull element cord 28. Put another way, in some embodiments, the chain stitch 36 terminates in the pull element cord 28 such that when a dog exerts a pull force on the pull element 18, the chain stitch 36 comes undone and the second end 22 of the body 14 is opened to release the items 26 therein. It will be understood that other types of stitching/sealing may be used that is released when the pull element cord 28 is pulled. In some embodiments, the items 26 are placed inside the inner chamber 24 of the body 14 and then the body 14 is completely sealed, with each of the first end 20 and the second end 22 being closed. For example, the device 10C may be disposable and may be sold pre-filled with items 26 and with the second end 22 stitched closed.

Figure 7:
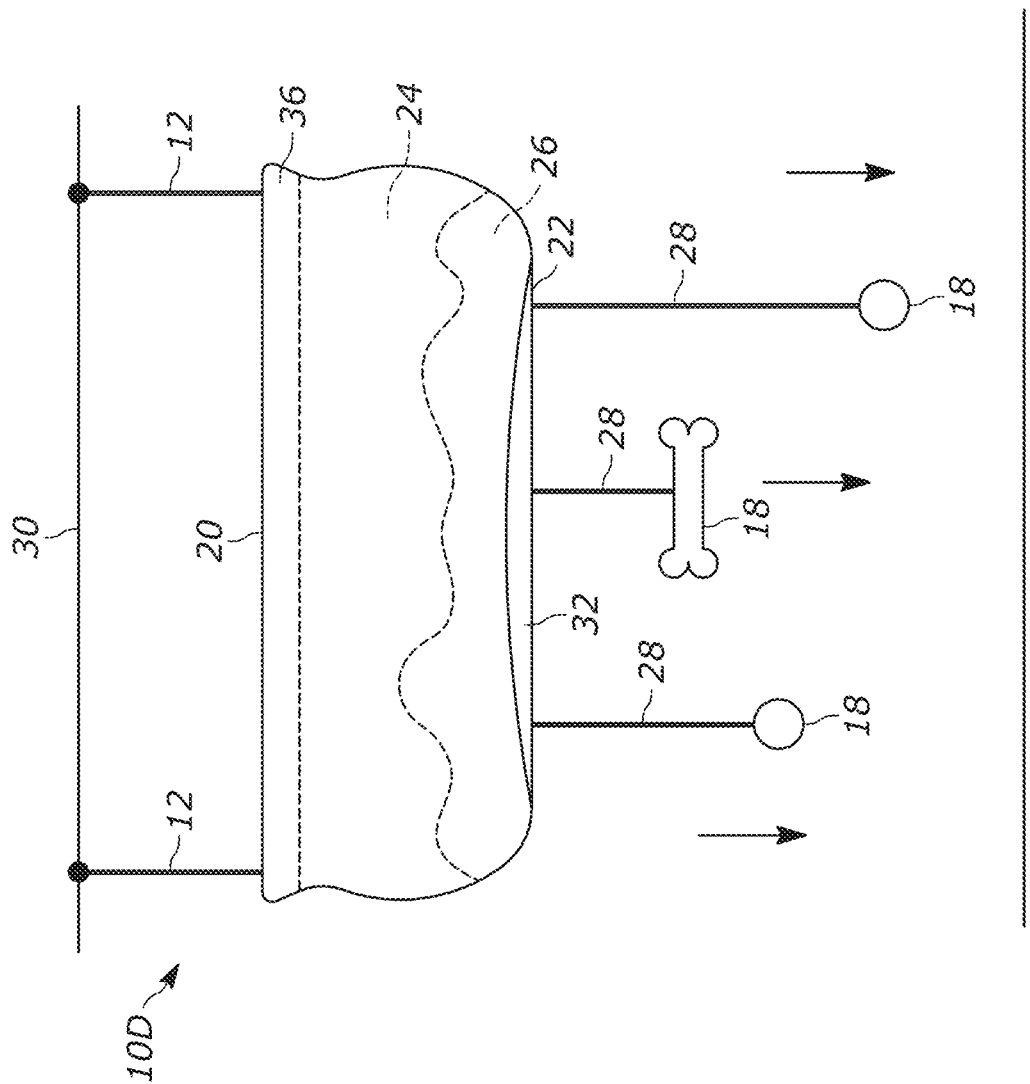
FIG. 7 shows a fourth exemplary embodiment of a device configured for engagement with a pet, in accordance with the present disclosure, the device being in a sealed configuration.
Figure 8:
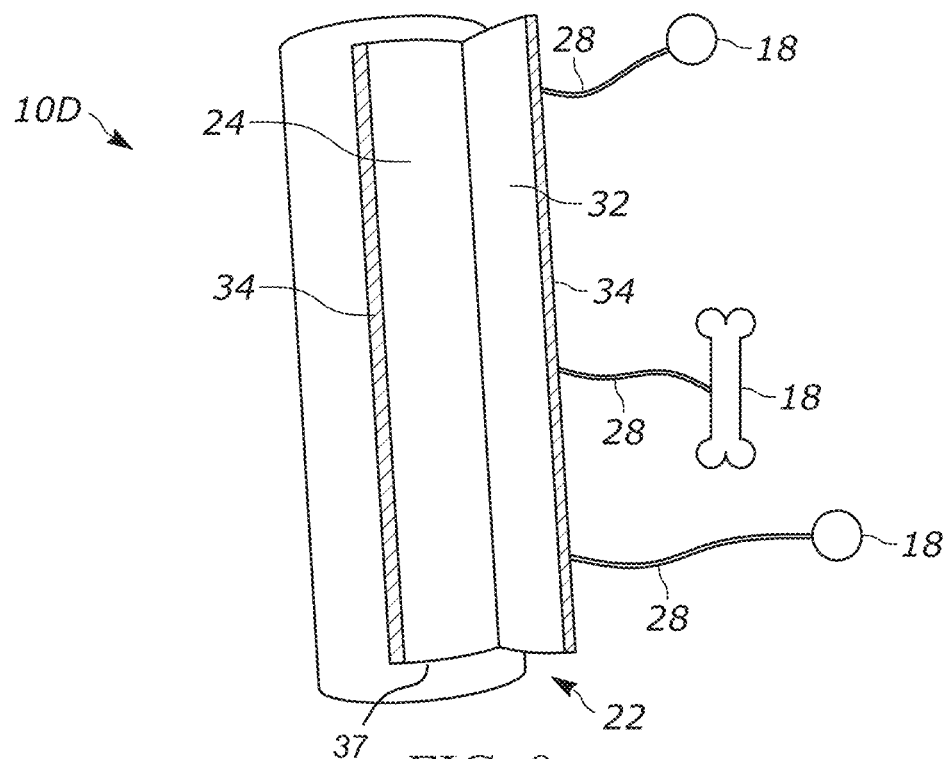
FIG. 8 shows a bottom view of the fourth exemplary embodiment of a device of FIG. 7, in accordance with the present disclosure, the device being in a sealed configuration.
Figure 9:
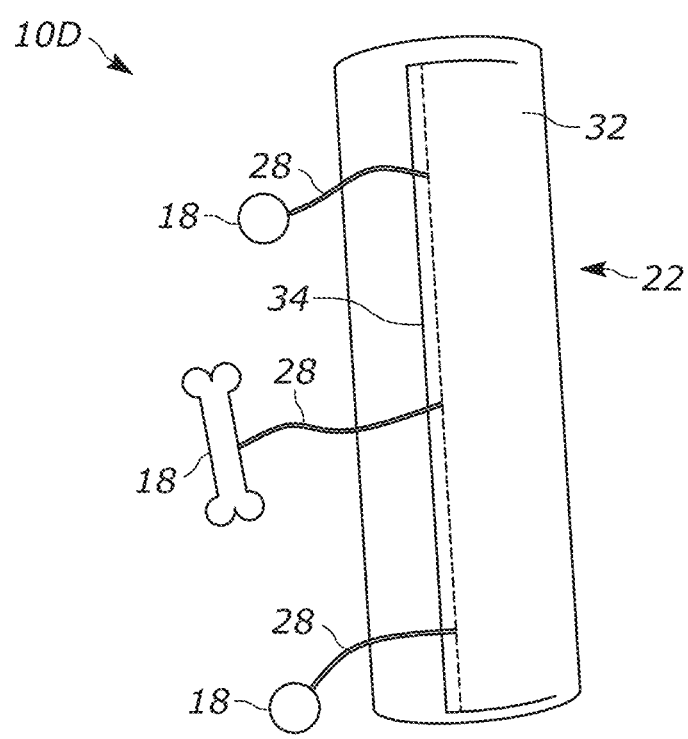
FIG. 9 shows a bottom view of the fourth exemplary embodiment of a device of FIG. 7, in accordance with the present disclosure, the device being in a prize release configuration.

Referring now to FIGS. 7-9, a fourth exemplary embodiment of a device 10D is shown. The device 10D generally includes at least one suspension cord 12, a body 14 with a first end 20 and a second end 22 opposite the first end 20, at least one closure element, and at least one pull element 18 attached to the second end 22 of the body 14 by a pull element cord 28. In one embodiment, the device 10D includes a plurality of pull elements 18, each being attached to the second end 22 of the body 14 by a pull element cord 28. For example, the embodiment shown in FIGS. 7-9 may be used to allow multiple dogs to engage with the device. In one embodiment, the body 14 is a bag or sack with a first end 20 that is open and a second end 22 that is sealable. In some embodiments, the body 14 is elongate and is suspended from a support 30 by more than one suspension cord 12 to balance the weight of the device 10D. In some embodiments, the suspension cord(s) 12, pull element(s) 18, and pull element cord(s) 28 are as shown and described in FIGS. 1 and 2. Further, in some embodiments, the components of the device 10D of FIGS. 7-9 are composed of the same or substantially similar materials as those of the devices shown and described in FIGS. 1-6.

Continuing to refer to FIGS. 7-9, in one embodiment the sealable second end 22 of the body includes one or more closure elements to facilitate closure of the second end 22. In one non-limiting example, the second end 22 includes or defines an opening 37 and a closure flap 32 that is configured to cover the opening 37 and attach to another portion of the second end 22 of the body 14, such as by one or more sealing elements in the form of fastening elements 34 such as hook-and-loop fastener, one or more snaps, magnets, clamps, adhesives, or other suitable fastening elements 34. In the non-limiting example shown in FIGS. 7-9, the device 10D includes a pair of complementary strips of hook-and-loop fastener. As for the device 10B shown in FIGS. 3 and 4, the number, size, type, and/or configuration of the fastening element(s) 34 may be chosen to suit the intended use of the device.

Continuing to refer to FIGS. 7-9, in one embodiment the pull element cord(s) 28 are permanently or removably attached to the second end 22 at location(s) at, on, or proximate the opening 37. In one non-limiting example, the pull element cord(s) 28 are permanently attached to the closure flap 32, at or proximate the edge of the closure flap 32 (as shown in FIGS. 8 and 9). Regardless of the fastening element(s) 34 used, the fastening elements 34 are configured to keep the second end 22 of the body 14 closed until a moderate pull force is exerted by the dog(s) on the pull element(s) 18.

Figure 10:
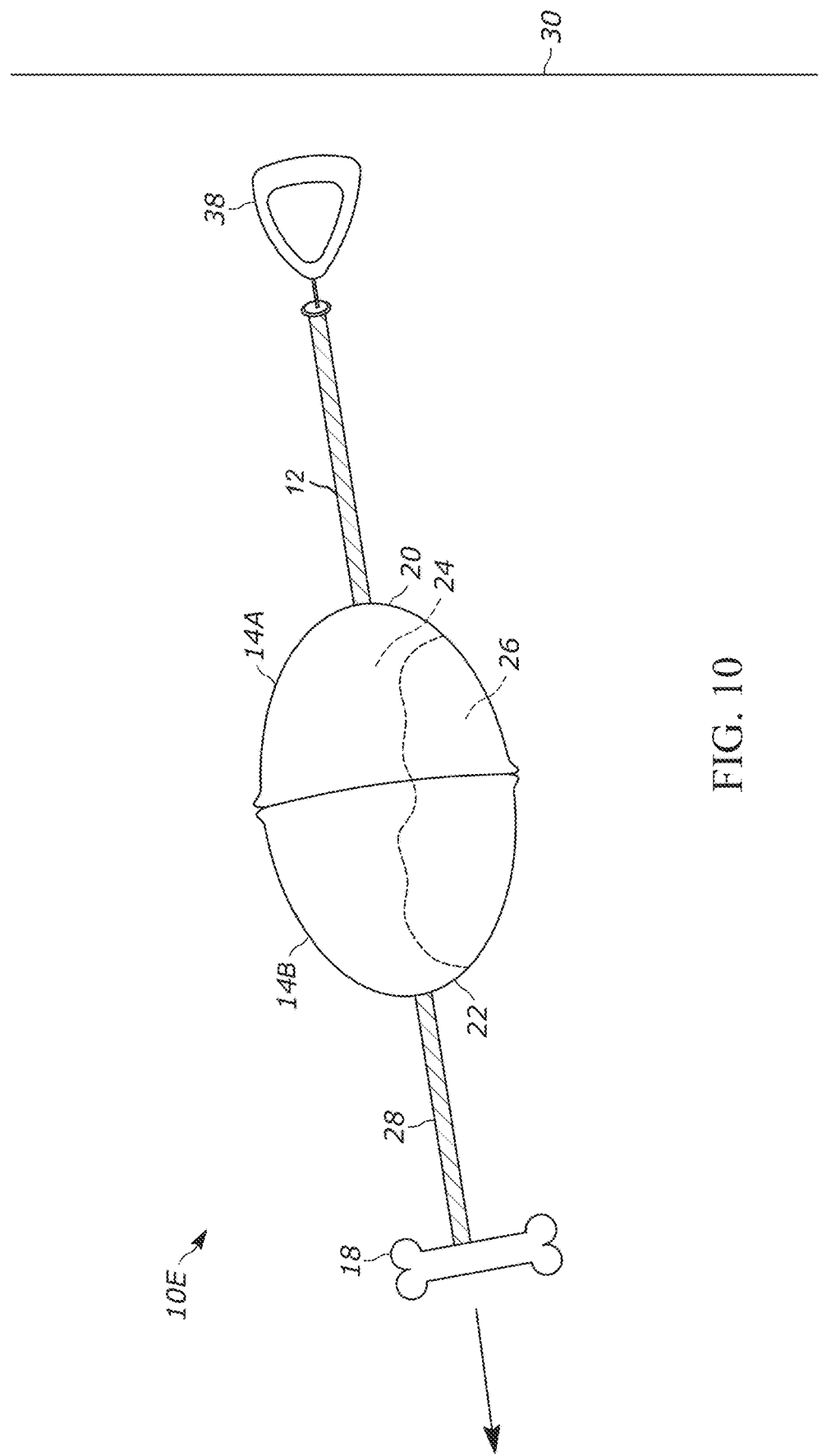
FIG. 10 shows a fifth exemplary embodiment of a device configured for engagement with a pet, in accordance with the present disclosure, the device being in a sealed configuration.
Figure 11:
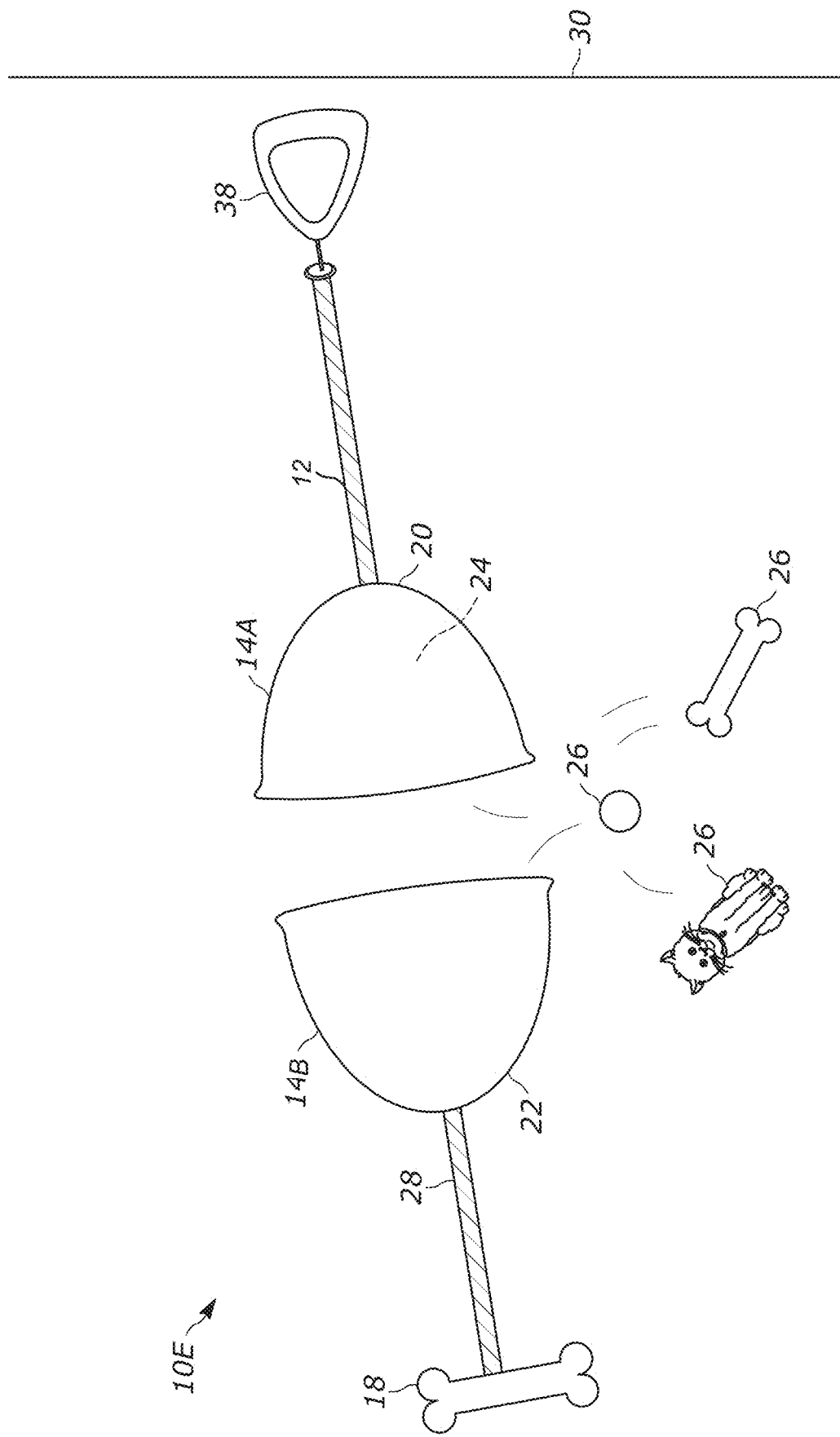
FIG. 11 shows the fifth exemplary embodiment of a device of FIG. 10, in accordance with the present disclosure, the device being in a prize release configuration.
Figure 12:
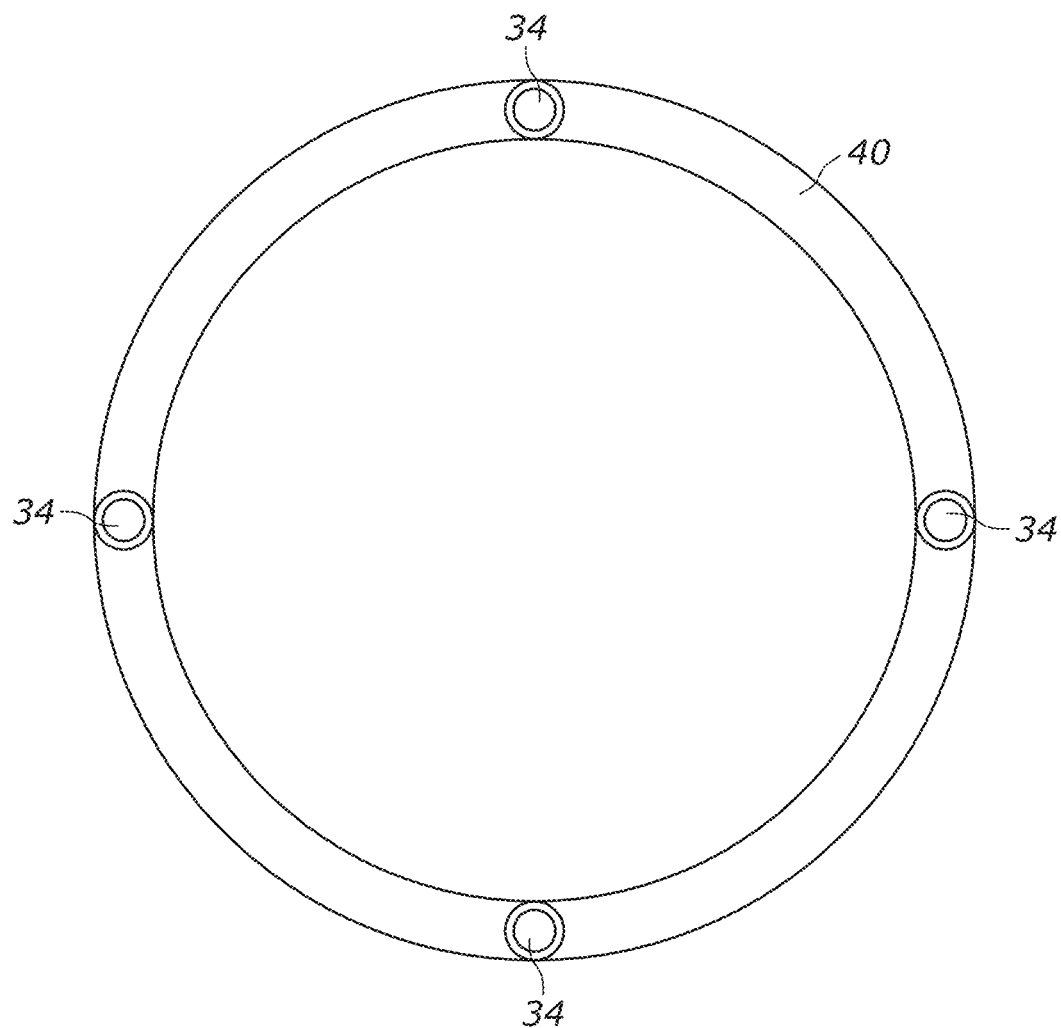
FIG. 12 shows a sealing edge of a first body portion of the fifth exemplary embodiment of a device of FIG. 10, in accordance with the present disclosure.

Referring now to FIGS. 10-12, a fifth exemplary embodiment of a device 10E is shown. The device 10E generally includes at least one suspension cord 12, a body 14 with a first end 20 and a second end 22, at least one closure element, and at least one pull element 18 attached to the second end 22 of the body 14 by a pull element cord 28. The embodiment shown in FIGS. 10-12 may be used when there is no suitable support from which to suspend the device 10E, when the user desires to attach the suspension cord 12 to a vertical or substantially vertical support 30, or when the user prefers to engage the dog in a game of "tug" using the device 10E. Although the cord 12 is referred to as a suspension cord 12, it will be understood that the device 10E does not need to be suspended from a support 30 when in use. Likewise, any embodiments shown and described herein may be used without being suspended from a surface. For example, the user may grasp the suspension cord 12 to suspend the device and/or the user may grasp a handle or other graspable element attached to the suspension cord 12, and the tension between the pull force exerted by the user and the pull force exerted by the dog on the pull element cord 28 may suspend the device therebetween.

Continuing to refer to FIGS. 10-12, in one embodiment the body 14 includes a first portion 14A and a second portion 14B that are removably attached or attachable to each other by one or more fastening elements 34. In one embodiment, the first portion 14A defines the first end 20 of the body 14 and is coupled to the suspension cord 12, and the second portion 14B defines the second end 22 of the body 14 and is coupled to at least one pull element cord 28. When the first and second portions 14A, 14B are attached to each other, the body 14 is sealed and defines the inner chamber 24 therein. In one embodiment, the first and second portions 14A, 14B each include a sealing edge 40 with at least one fastening element 34. As discussed above regarding the devices of FIGS. 1-9, the fastening element(s) may be hook-and-loop fastener, snaps, clamps, magnets, adhesives, or other suitable sealing elements or combinations thereof. Further, in some embodiments, the components of the device 10E of FIGS. 10-12 are composed of the same or substantially similar materials as those of the devices shown and described in FIGS. 1-9, including paper and/or woven and/or non-woven fabrics. In other embodiments, each of the first and second portions 14A, 14B are composed of a rigid or semi-rigid material, such as plastic, silicone, or the like, or combinations thereof.

Continuing to refer to FIGS. 10-12, in one non-limiting example, the sealing edge 40 of the first portion 14A and the sealing edge 40 of the second portion 14B each includes a plurality of fastening elements 34 (for example, magnets), as shown in FIG. 12, and the sealing edges 40 are alignable with each other such that the fastening elements 34 of one sealing edge 40 operatively engage the fastening elements 34 of the other sealing edge 40 to seal the join the first and second portions of the body 14 and to keep the items 26 within the inner chamber 24 when the device 10E is in use. Regardless of the fastening element(s) 34 used, the fastening elements 34 are configured to keep the body 14 closed until a moderate pull force is exerted by the dog(s) on the pull element(s) 18. Additionally, the attachment point(s) between the pull element cord(s) 28 and the second end 22 of the body 14 are stronger than the fastening means 34, to ensure that the pull force exerted on the pull element(s) 18 will open the body 14 (detach the first and second portions 14A, 14B from each other) before the pull element cord(s) 28 are detached from the body 14. In some embodiments, the body 14 of the device of FIGS. 10-12 is composed of the same material(s) as the body shown and described in FIGS. 1-9.

Continuing to refer to FIGS. 10-12, in some embodiments, the suspension cord(s) 12, pull element(s) 18, and pull element cord(s) 28 are as shown and described in any of FIGS. 1-9. For simplicity, the suspension cord 12 of the device 10E of FIGS. 10-12 is referred to as a suspension cord, even if it is not intended to suspend the device 10E when in use (for example, if the device is used as a tug toy). Further, in one embodiment the free end of the suspension cord 12 not attached to the body includes a handle 38, loop, or other structure that is graspable by the user, such as when the device 10E is used as a tug toy. Thus, in one non-limiting example of use, the exertion of a pull force on the pull element 18 and/or the suspension cord 12 and handle 38 will be sufficient to overcome the engagement of the fastening elements 34 between the first and second portions 14A, 14B of the body. When the first and second portions 14A, 14B become disengaged, the item(s) 26 within the inner chamber 24 are released. In some embodiments, such as when the device 10E is to be used as a tug toy, the fastening elements 34 (such as the number, size, type, and/or configuration) may be chosen to provide more resistance. Therefore, the amount of pull force required to be exerted on the pull element 18 and/or handle 38 to disengage the first and second portions 14A, 14B of the body may be more, or slightly more, than a moderate pull force to allow for some tug play before the items 26 are released. Further, it will be understood that any of the devices shown and described herein may include a handle 38 attached or attachable to the suspension cord 12, so the device may be used for tug play and/or to be attached to a vertical surface instead of or in addition to being suspended from a horizontal surface.

Continuing to refer to FIGS. 10-12, in some embodiments the body 14 is not composed of separate portions 14A, 14B, but is rather made from a material that is configured to rip or tear at one or more locations between the first end 20 and the second end 22. For example, the body 14 may be composed of a paper-based material, such as thick or multilayered paper (such as Kraft paper), light cardboard, paperboard, folded box board, or the like. In some embodiments, the material is thin enough that it readily tears at at least one location when a moderate pull force, or greater, is exerted on the pull element 18, such as along a paper grain. Additionally or alternatively, the body 14 may include one or more lines or areas of weakness (such as perforations, creases, thin areas, or the like) that more readily rip or tear than other areas of the body 14. Thus, the device 10E is usable for tug play, but the body may be torn or ripped to release the items 26 therein rather than two separate portions 14A, 14B separating from each other by the disengagement of fastening elements. In some embodiments, the items 26 are placed inside the inner chamber 24 of the body 14 and then the body 14 is completely sealed, with each of the first end 20 and the second end 22 being closed. For example, the device 10E may be disposable and may be sold pre-filled with items 26.

Figure 13:
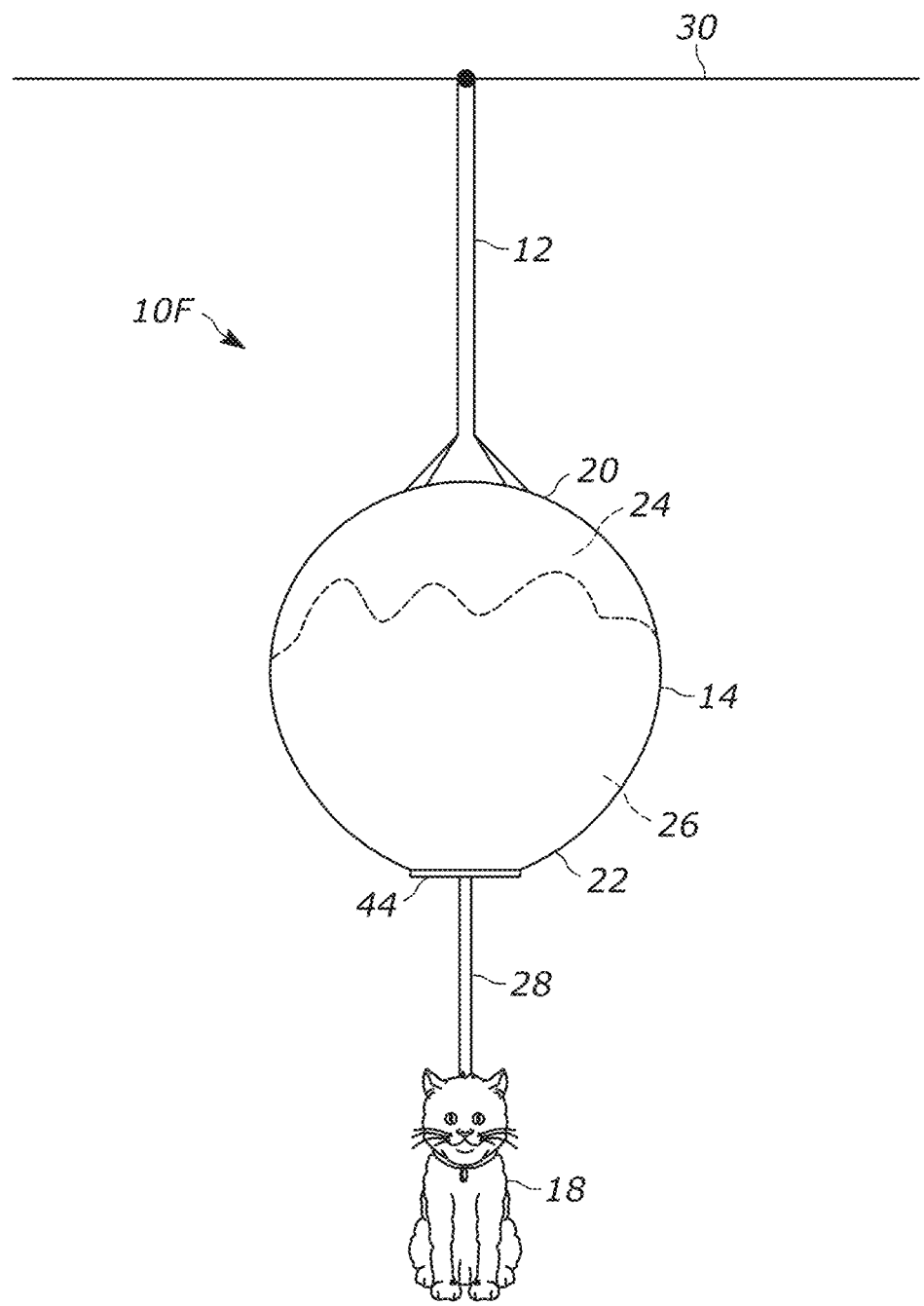
FIG. 13 shows a sixth exemplary embodiment of a device configured for engagement with a pet, in accordance with the present disclosure, the device being in a sealed configuration.
Figure 14:
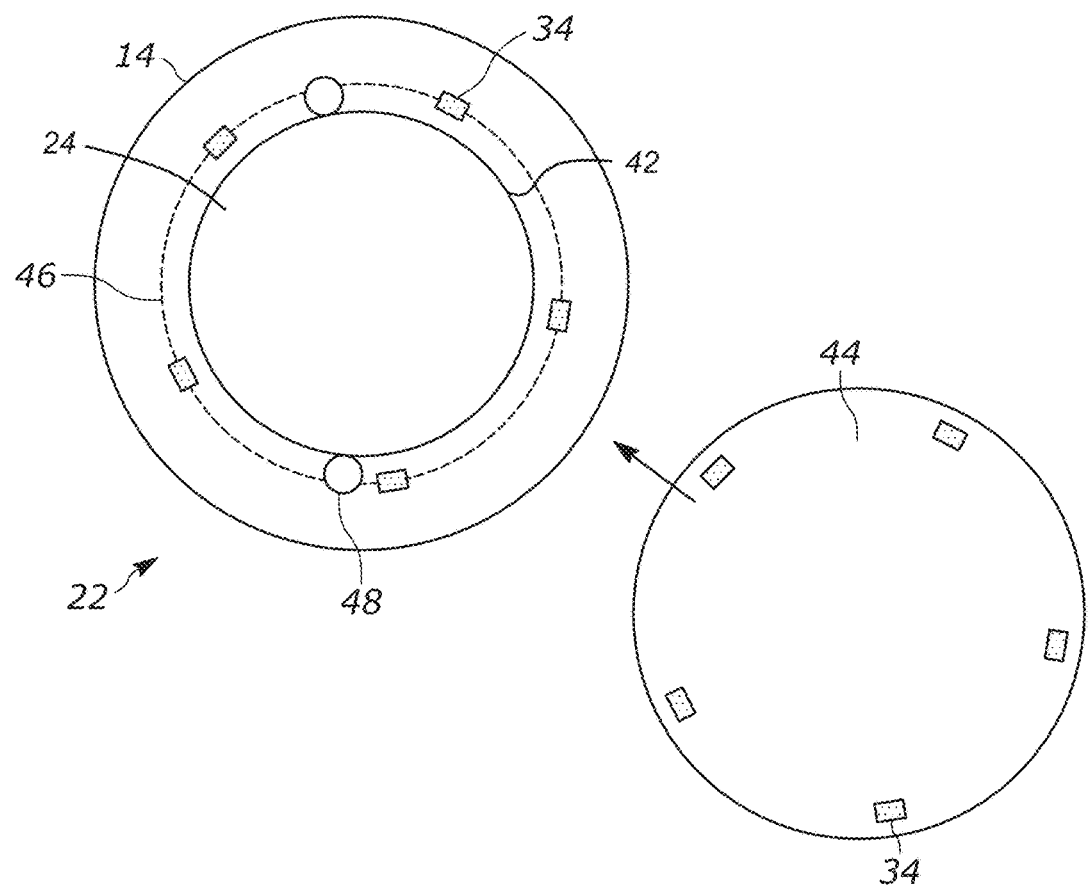
FIG. 14 shows a bottom view of the sixth exemplary embodiment of a device of FIG. 13 and a sealing element in accordance with the present disclosure, the sealing element being detached from the device.
Figure 15:
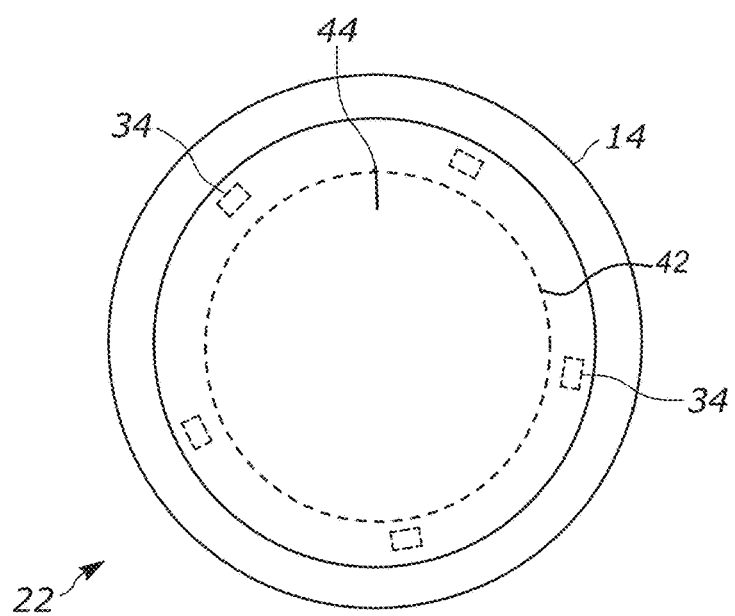
FIG. 15 shows a bottom view of the sixth exemplary embodiment of a device of FIG. 13 and a sealing element in accordance with the present disclosure, the sealing element being attached to the device.

Referring now to FIGS. 13-15, a sixth exemplary embodiment of a device 10F is shown. The device 10F generally includes at least one suspension cord 12, a body 14 with a first end 20 and a second end 22 opposite the first end 20, at least one closure element, and at least one pull element 18 attached to the second end 22 of the body 14 by a pull element cord 28. Further, in some embodiments, the components of the device 10D of FIGS. 7-9 are composed of the same or substantially similar materials as those of any of the devices shown and described in FIGS. 1-12.

Continuing to refer to FIGS. 13-15, the first end 20 of the body is open or closed, and the second end 22 of the body 14 is open and defines an opening 42. In some embodiments, the device 10F also includes a sealing panel 44 that is sized and configured to fit over the opening 42 to close the second end 22 of the body 14. For example, the diameter of the sealing panel 44 is greater than the diameter of the opening 42. In one embodiment, the second end 22 of the body 14 includes one or more sealing elements in the form of fastening elements 34 such as hook-and-loop fastener, one or more snaps, magnets, clamps, adhesives, or other suitable fastening elements 34. In one embodiment, the device 10F includes one or more fastening elements 34 extending around or positioned around the opening 42, at locations proximate the opening 42. Likewise, in some embodiments the sealing panel 44 includes one or more complementary fastening elements 34 extending around or positioned around the outer edge of the sealing panel 44, at locations proximate the outer edge. Thus, the sealing panel 44 may be placed over the opening 42 of the second end 22 such that the fastening elements 34 of the second end 22 (for example, as shown in FIG. 15) and the sealing panel 44 engage each other and seal the body 14 to retain items 26 within the inner chamber.

Continuing to refer to FIGS. 13-15, in some embodiments the second end 22 includes a frame 46 that extends around the opening 42 to provide support and/or shape to the second end 22 and/or the opening 42. The frame 46 may be adhered or coupled to the body 14 within the inner chamber 24 or on an outer surface of the body 14, or may be sewn or adhered into and/or between layers of the body material. In some non-limiting examples, the frame is composed of bamboo, stiff rope, or other rigid or semi-rigid material that is non-toxic to dogs and will not harm the dog should the frame 46 break away from the body 14 during use and consumed by the dog. In some embodiments, the frame 46 may include one or more hinges 48 (for example, as shown in FIG. 14) or may be composed of several portions such that the frame may be folded for easy storage, packaging, and/or shipment.

Continuing to refer to FIGS. 13-15, in some embodiments the pull element cord 28 is attached or affixed to the sealing panel 44 such that the pull element 18 hangs from the sealing panel 44 when the sealing panel 44 is coupled to the second end 22 of the body 14 and the device 10F is in use (for example, as shown in FIG. 13). The pull element 18 and pull element cord 28 are not shown in FIGS. 14 and 15 for simplicity. The fastening elements 34 are configured such that, during use, the exertion of a moderate pull force on the pull element 18 will disengage the sealing panel 44 from the second end 22 of the body to release the items 26 from the inner chamber 24. In some embodiments, the body 14 and the sealing panel 44 are composed of paper, and the fastening elements are adhesives. In one non-limiting example, the sealing panel 44 is composed paper and has an adhesive backing, like a sticker, and is simply adhered to the area of the second end 22 of the body surrounding the opening 42. In some embodiments, the exertion of a moderate pull force on the pull element 18 will tear the sealing panel 44 from the second end 22 of the body 14 and/or will tear the body 14 open to release the items 26 therein.

Figure 16:
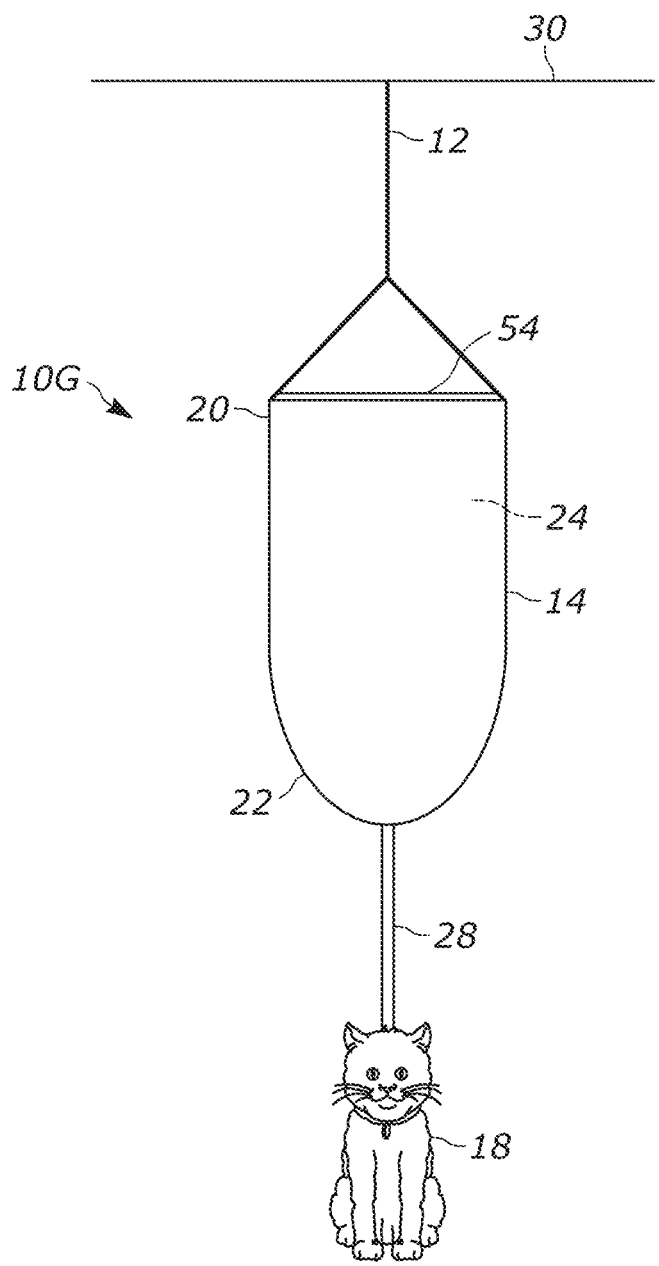
FIG. 16 shows a seventh exemplary embodiment of a device configured for engagement with a pet, in accordance with the present disclosure.

Referring now to FIG. 16, a seventh exemplary embodiment of a device 10G is shown. The device 10G generally includes a suspension cord 12, a body 14 with a first end 20 and a second end 22 opposite the first end 20, a closure element, and a pull element 18 attached to the second end 22 of the body 14 by a pull element cord 28. Further, in some embodiments, the components of the device 10G of FIG. 16 are composed of the same or substantially similar materials as those of any of the devices shown and described in FIGS. 1-15.

Continuing to refer to FIG. 16, in some embodiments the body 14 includes a first end 20 that is open and a second end 22 that is closed. Thus, items 26 may be placed in the inner chamber 24 through the open first end 20. In some embodiments, the first end 20 includes a frame 54 surrounding the opening to provide support and/or shape to the first end 20 and/or the opening in the first end 20. The frame 46 may be adhered or coupled to the body 14 within the inner chamber 24 or on an outer surface of the body 14, or may be sewn or adhered into and/or between layers of the body material. In some non-limiting examples, the frame is composed of bamboo, stiff rope, or other rigid or semi-rigid material that is non-toxic to dogs and will not harm the dog should the frame 46 break away from the body 14 during use and consumed by the dog. In some embodiments, the frame 46 may include one or more hinges 48 (for example, as shown in FIG. 14) or may be composed of several portions such that the frame may be folded for easy storage, packaging, and/or shipment.

Continuing to refer to FIG. 16, the pull element cord 28 is attached to, affixed to, or integrated with the second end 22 of the body 14. In some embodiments, the body 14 is composed of paper (such as Kraft paper, parchment paper, or the like), light cardboard, paperboard, folded box board, or other material that may be torn or ripped relatively easily, while still being strong enough to contain items 26 within the inner chamber 24 without tearing before a pull force is exerted on the pull element 18. In some embodiments, the material is thin enough that it readily tears at at least one location when a moderate pull force, or greater, is exerted on the pull element 18, such as along a paper grain. Additionally or alternatively, the body 14 may include one or more lines or areas of weakness (such as perforations, creases, thin areas, or the like) that more readily rip or tear than other areas of the body 14. In use, when a moderate pull force is exerted on the pull element 18, the attachment point between the pull element cord 28 and the second end 22 of the body 14 is strong enough that the second end 22 of the body 14, or other portion of the body 14 between the first end 20 and the second end 22, will tear or rip to release the items 26 from the inner chamber 24.

In one embodiment, a device for containing and releasing items therein comprises: a body defining an inner chamber and at least one closable opening; and a pull element attached to the body, the pull element being configured to open the opening of the body when a pull force is exerted on the pull element.

In one aspect of the embodiment, the pull element is attached to a pull element cord.

In one aspect of the embodiment, the pull element cord is directly attached to the body. In one aspect of the embodiment, the body includes at least one sealing element proximate the closable opening, the pull element cord being attached to the body at a location proximate the at least one sealing element. In one aspect of the embodiment, at least one sealing element is at least one of a hook-and-loop fastener, a magnet, a snap, and a clamp.

In one aspect of the embodiment, the device further comprises a closure element configured to be removably attached to the body to close the closable opening, the pull element cord being attached to the closure element. In one aspect of the embodiment, the closure element is a clamp.

In one aspect of the embodiment, the device further comprises at least one suspension cord attached to the body.

In one aspect of the embodiment, the closable opening is configured to be opened without damaging the body.

In one embodiment, a device for containing and releasing items therein comprises: a body defining a first body portion and a second body portion that is removably couplable to the first body portion; and a pull element attached to the body, the pull element being configured to open the opening of the body when a pull force is exerted on the pull element.

In one aspect of the embodiment, each of the first body portion and the second body portion includes at least one sealing element, the at least one sealing element of the first body portion being configured to be aligned with the at least one sealing element of the second body portion to close the body.

In one aspect of the embodiment, the device further comprises a suspension cord coupled to the first body portion and a pull element cord coupled to the second body portion and the pull element.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, "and/or" means "and" or "or". For example, "A and/or B" means "A, B, or both A and B" and "A, B, C, and/or D" means "A, B, C, D, or a combination thereof" and said "A, B, C, D, or a combination thereof" means any subset of A, B, C, and D, for example, a single member subset (e.g., A or B or C or D), a two-member subset (e.g., A and B; A and C; etc.), or a three-member subset (e.g., A, B, and C; or A, B, and D; etc.), or all four members (e.g., A, B, C, and D).

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A device for containing and releasing items therein, the device comprising:
    a fabric body defining an inner chamber and a closable opening;
    a closure element that is removably attached to the fabric body to compress the closable opening to close the closable opening, the closure element being a clip or a clamp;
    a pull element attached to the fabric body, the fabric body being flexible, the pull element being configured to open the closable opening of the fabric body when the closable opening is in a closed configuration and a pull force is exerted on the pull element; and
    a pull element cord having a first end and a second end opposite the first end, the first end of the pull element cord being attached to the closure element and the second end of the pull element cord being attached to the pull element, such that a pull force exerted on the pull element causes the closure element to detach from the fabric body without damaging the fabric body.

2. The device of claim 1, wherein closure element is a clamp.

3. The device of claim 1, further comprising at least one suspension cord attached to the fabric body.

4. The device of claim 3, wherein the at least one suspension cord includes a first end and a second end opposite the first end, the first end of the pull element cord being attached to the fabric body at a first location and the second end of the at least one suspension cord being attached to the fabric body at a second location that is different than the first location.

5. The device of claim 4, wherein the second location is opposite the first location.

6. A device for containing and releasing items therein, the device comprising:
- a body, the body composed of at least one of a paper-based material and a fabric, the body defining an inner chamber;
- a graspable element attached to the body at a first location; and
- a pull element attached to the body at a second location, the graspable element and/or the pull element being configured to tear the body into at least two fully separated portions to expose the inner chamber when a pull force is exerted on the graspable element and/or the pull element, the pull element being a dog toy, a stuffed toy, a ball, and/or an edible pet treat.

7. A device for containing and releasing toy items therein, the device comprising:
- a sealed body defining an inner chamber, the sealed body being composed of a material that is configured to be torn;
- one or more toy items within the inner chamber of the sealed body;
- a pull element attached to the body, the body being configured to be torn into at least two fully separated portions when a pull force is exerted on the pull element, the pull element being a dog toy, a stuffed toy, a ball, and/or an edible pet treat;
- a pull element cord having a first end and a second end opposite the first end, the first end of the pull element cord being attached to the body at a first location and the second end of the pull element cord being attached to the pull element; and
- a suspension cord having a first end and a second end opposite the first end, the first end of the suspension cord being attached to a handle and the second end of the suspension cord being attached to the body at a second location.

8. The device of claim 7, wherein the first location is opposite the second location.

9. The device of claim 7, wherein the body is composed of a paper-based material.

10. The device of claim 9, wherein the body includes at least one area of weakness.

* * * * *